Jan. 7, 1969 R. C. NOLES ET AL 3,420,474
METHOD FOR COLLAPSING AN AERODYNAMIC DECELERATING VEHICLE
Filed Aug. 25, 1967
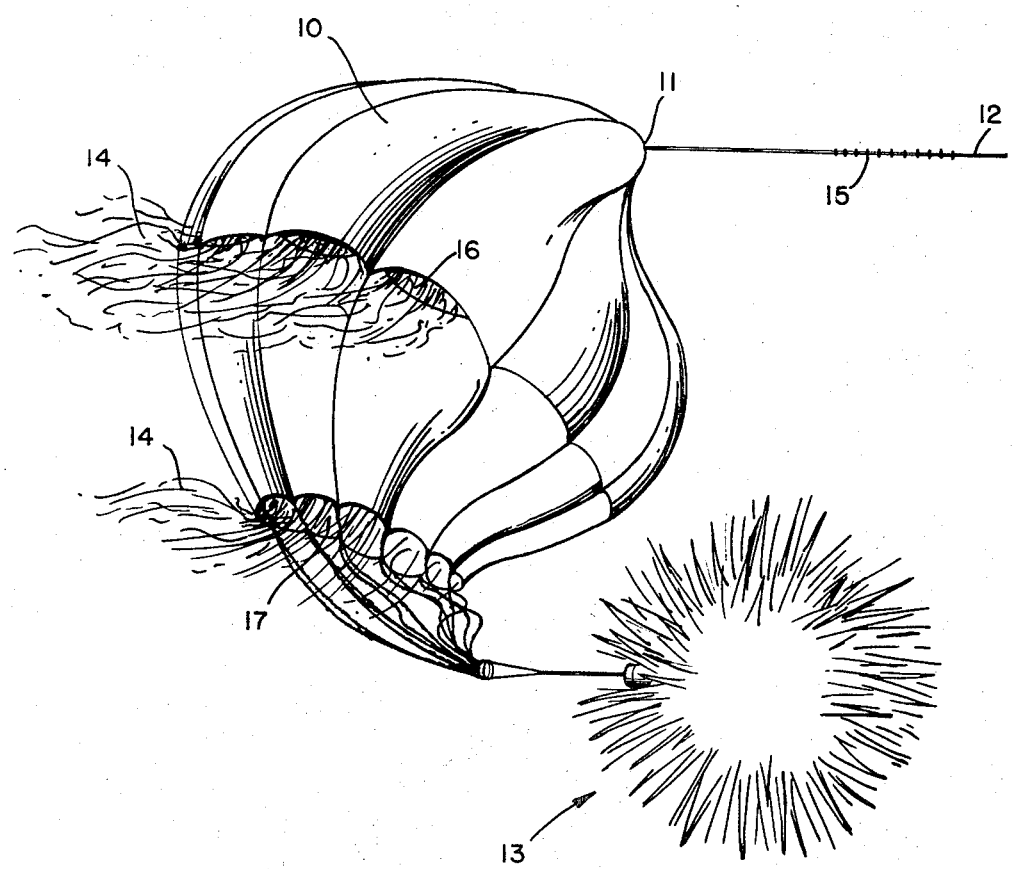
INVENTORS.
RONALD C. NOLES
JIMMIE M. CRAIG
BY
ROY MILLER
ATTORNEY.

United States Patent Office 3,420,474
Patented Jan. 7, 1969

3,420,474
METHOD FOR COLLAPSING AN AERODYNAMIC DECELERATING VEHICLE
Ronald C. Noles and Jimmie M. Craig, China Lake, Calif., assignors to the United States of America as represented by the Secretary of the Navy
Filed Aug. 25, 1967, Ser. No. 663,453
U.S. Cl. 244—31  1 Claim
Int. Cl. B64b 1/58; B64d 17/14; F41j 9/00

ABSTRACT OF THE DISCLOSURE

A method for collapsing an aerodynamic decelerating vehicle, such as a balloon or parachute adapted to carry a payload, which comprises securing by suitable means to the apex of the vehicle a line or streamer of predetermined weight so that it hangs loosely over the outside of the vehicle. When the payload is delivered and the holder carrying the payload becomes less than the weight of the line, the vehicle tips over causing evacuation of the supporting air or gas and subsequent descent of the vehicle.

Government interest

The invention herein described may be manufactured and used by or for the Government of the United States of America for governmental purposes without the payment of any royalties thereon or therefor.

Background of the invention

The present invention is directed to a means for collapsing an aerodynamic decelerating vehicle; more specially to collapsing a balloon or parachute after delivery of a payload.

Various means have been employed for completely or partially collapsing a parachute after it has been initially opened and then subsequently reopened to deliver the payload to the ground. A simple method for collapsing a balloon once it had accomplished its mission causing it to descend at a predetermined time presented a problem. It is therefore a general purpose of the present invention to provide a simple method and means for causing descent of a balloon or similar vehicle at a predetermined time and in a predetermined area thereby avoiding a hazardous condition due to aircraft operating in the area and without damaging the vehicle.

Summary of the invention

The present invention comprises securing a weighted line to the apex of an aerodynamic decelerating vehicle so that it hangs freely over the outside of the vehicle. The vehicle is adapted to carry a load such as munitions, ordnance, supplies, people, etc., and the line is weighted so that it will at least equal the weight of the holder, container or seat used for containing or holding the load to be delivered by the vehicle. When the load is delivered the container or holder therefor becomes equal to or less than the weight of the line causing the vehicle to tip over permitting evacuation of the gas or air supporting it and subsequent descent to the ground or predetermined area.

Description of the drawing

The single figure is a perspective view showing a balloon incorporating a tip-over means in accordance with the present invention.

Detailed description of the invention

Referring now to the drawing there is shown balloon 10 which is constructed of a nonporous, tough, flexible, light-weight, gas-barrier conventional balloon material, such as nylon, filled with heated air 14 so as to rise and float in the atmosphere. Secured to the apex or top 11 is a weighted line or streamer 12 which hangs loosely over the outside of balloon 10. Line 12 consisting of cotton or plastic tape of varying width has weights 15 secured at predetermined points along its length. When balloon 10 has accomplished its mission which comprises illuminating a ground area by the burning of a flare candle supported in a container, both generally designated as a flare assembly 13, there is a point at which the container (after candle burnout) becomes equal to or less than the weight of line 12. Balloon 10 then tips over allowing gases 14 to evacuate through ports or openings generally designated 16 and 17 causing descent of the balloon without damage to it.

This method of collapsing an aerodynamic decelerating vehicle has been generally known to those working in the area as "streamering" a balloon or parachute, etc. The streamer is known also as a "tip-over-line."

What is claimed is:
1. A balloon comprising in combination
   a framework consisting of a nonporous, lightweight material substantially filled with heated air so as to float in the atmosphere;
   a payload and holder therefor;
   means for supporting said payload and holder to the base of said framework; and
   a line secured to the top of said framework; said line being weighted so that it is about equal to the weight of said holder whereby upon delivery of said payload said line becomes about equal to said holder causing said balloon to tip over evacuating the air and causing subsequent descent of the balloon.

References Cited

UNITED STATES PATENTS

| | | | |
|---|---|---|---|
| 1,554,050 | 9/1925 | Slye | 46—87 |
| 2,502,470 | 4/1950 | Martin | 244—122 |
| 2,523,064 | 9/1950 | Ruthven | 46—86 |
| 2,864,569 | 12/1958 | Froehlich | 244—33 |
| 3,055,616 | 9/1962 | Sandlin | 244—31 |

MILTON BUCHLER, *Primary Examiner.*
RICHARD A. DORNON, *Assistant Examiner.*

U.S. Cl. X.R.
244—152; 46—87